United States Patent
Yashiro et al.

(10) Patent No.: US 6,784,580 B2
(45) Date of Patent: Aug. 31, 2004

(54) MOTOR AND PRESSURE GENERATING APPARATUS INCORPORATING THE MOTOR

(75) Inventors: Hirokazu Yashiro, Gifu-ken (JP); Youichi Kuwayama, Gifu-ken (JP)

(73) Assignee: Ibiden Co., Ltd., Gifu-ken (JP)

( * ) Notice: Subject to any disclaimer, the term of this patent is extended or adjusted under 35 U.S.C. 154(b) by 0 days.

(21) Appl. No.: 10/288,120

(22) Filed: Nov. 5, 2002

(65) Prior Publication Data

US 2003/0102748 A1 Jun. 5, 2003

Related U.S. Application Data

(62) Division of application No. 09/536,569, filed on Mar. 28, 2000, now Pat. No. 6,498,410.

(51) Int. Cl.[7] .............................................. F04D 19/04
(52) U.S. Cl. ..................................................... 310/90.5
(58) Field of Search ............... 310/90.5, 91; 417/423.4, 417/423.12

(56) References Cited

U.S. PATENT DOCUMENTS

| | | | | |
|---|---|---|---|---|
| 3,221,389 A | * | 12/1965 | Cowell | 19/288 |
| 3,899,223 A | * | 8/1975 | Baermann | 310/90.5 |
| 4,340,260 A | * | 7/1982 | Forster et al. | 310/90.5 |
| 4,644,202 A | | 2/1987 | Kroy et al. | |
| 4,867,657 A | | 9/1989 | Kotlarek et al. | |
| 5,152,679 A | * | 10/1992 | Kanemitsu et al. | 417/423.4 |
| 5,341,059 A | * | 8/1994 | Fukuyama et al. | 310/90.5 |
| 5,495,221 A | * | 2/1996 | Post | 335/299 |
| 5,506,459 A | * | 4/1996 | Ritts | 310/90.5 |
| 5,521,448 A | * | 5/1996 | Tecza et al. | 310/90.5 |
| 5,613,831 A | * | 3/1997 | Liegat | 415/229 |
| 5,652,473 A | * | 7/1997 | Delamare et al. | 310/90.5 |
| 5,847,480 A | * | 12/1998 | Post | 310/90.5 |
| 5,894,181 A | * | 4/1999 | Imlach | 310/90.5 |
| 6,218,751 B1 | * | 4/2001 | Bohlin | 310/90.5 |
| 6,498,410 B1 | | 12/2002 | Yashiro et al. | |

FOREIGN PATENT DOCUMENTS

| | | | | |
|---|---|---|---|---|
| JP | 61-210290 | * | 9/1986 | F04D/19/04 |
| JP | 62-111194 | * | 5/1987 | F04D/19/04 |
| JP | 63-14894 | | 1/1988 | |
| JP | 02-16389 | | 1/1990 | |
| JP | 4-209996 | * | 7/1992 | F04D/19/04 |
| JP | 4-246287 A | | 9/1992 | |
| JP | 61-185698 | * | 8/1996 | F04D/19/04 |
| JP | 11-13687 A | | 1/1999 | |
| JP | 11-93888 | | 4/1999 | |

* cited by examiner

*Primary Examiner*—Burton Mullins
(74) *Attorney, Agent, or Firm*—Crompton, Seager & Tufte, LLC

(57) ABSTRACT

A compact turbo-molecular pump having a high depressurizing capability. A motor driving the pump includes a rotary shaft, the distal and basal ends of which are supported by magnetic bearings. Each magnetic bearing has a rotated magnet, which is rotated integrally with the rotary shaft, and a fixed magnet, which is opposed to the rotated magnet. The rotated and fixed magnets repel each other. The diameter of the magnetic bearing at the distal end of the rotary shaft is greater than that of the magnetic bearing at the basal end. This decreases movement of the rotary shaft toward its distal end when the pump operates.

7 Claims, 9 Drawing Sheets

MOTOR AND PRESSURE GENERATING APPARATUS INCORPORATING THE MOTOR

This application is a divisional application of U.S. patent application Ser. No. 09/536,569, filed Mar. 28, 2000, now U.S. Pat. No. 6,498,410.

BACKGROUND OF THE INVENTION

The present invention relates to a motor, and more particularly, to a motor for a pressure generating apparatus such as a turbo-molecular pump.

A turbo-molecular pump produces an ultra-high vacuum state and is employed in, for example, semiconductor fabrication related apparatuses (e.g., sputtering apparatuses, chemical vapor deposition (CVD) apparatuses, and etching apparatuses) and measuring apparatuses (e.g., electron microscopes, surface analysis apparatuses, and environment testing apparatuses). A typical turbo-molecular pump includes a rotary shaft and a plurality of rotor vanes fixed to the rotary shaft. The turbo-molecular pump rotates the rotor vanes to produce a molecular flow and to discharge gases. This causes an ultra-high vacuum state in the interior of the apparatus connected to the turbo-molecular pump.

The rotary shaft is rotated at a high speed to produce the ultra-high vacuum state. The bearing that supports the rotary shaft must thus be capable of high speed rotation. A ball bearing, which requires lubricating oil, is not appropriate for such application. This is because the vapor pressure of the lubricating oil, although low, hinders depressurization to the ultra-vacuum state by the turbo-molecular pump. Further, vaporized lubricating oil contaminates vacuum chambers. Accordingly, Japanese Unexamined Utility Model Publication No. 63-14894 and Japanese Unexamined Patent Publication No. 2-16389 describe a turbo-molecular pump that does not use lubricating oil.

FIG. 9 shows a turbo-molecular pump 60, which is described in Japanese Unexamined Patent Publication No. 2-16389. The turbo-molecular pump 60 includes a motor 63 and a housing 67. The motor 63 has a rotary shaft 64 to which a wheel 62 is secured. Rotor vanes 62a extend radially from the wheel 62. A magnetic bearing 61 and an air bearing 66 rotatably support the rotary shaft 64. The magnetic bearing 61 and the air bearing 66 restrict axial and radial movement of the rotary shaft 64. The magnetic bearing 61 is accommodated in the housing 67, which includes a cylinder 67a, and has a plurality of magnets 65 arranged in the cylinder 67a. The magnets 65 are opposed to magnets (not shown) that are embedded in the walls of a bore 62b formed in the wheel 62. The repelling force between the magnets 65 and the magnets of the wheel 62 rotates the wheel 62 about the cylinder 67a without contacting the cylinder 67a. The rotary shaft 64 extends through a case 68. The air bearing 66 is located at the basal end, or lower end, of the rotary shaft 64, which extends from the case 68, and has a dynamic pressure bearing portion 69. The dynamic pressure bearing portion 69 has a plurality of dynamic pressure grooves in the surface opposing the case 68. High speed rotation of the rotary shaft 64 causes the dynamic pressure grooves to form a compressed gas layer, which radially supports the rotary shaft 64.

During operation of the turbo-molecular pump 60, the pressure applied to the upper end of the rotary shaft 64 (the wheel 62) is less than the pressure applied to the lower end of the rotary shaft 64. The pressure difference displaces the rotary shaft 64 axially toward the wheel 62. The displacement results in the rotary shaft 64 (the wheel 62) interfering with the surrounding components and hinders smooth operation of the motor 63. Thus, a no-contact bearing that supports the rotary shaft 64 without interference even when a pressure difference occurs is needed.

Accordingly, the number of air bearings may be increased or a larger air bearing may be employed. Further, in the magnetic bearings, the number of magnets may be increased or a larger magnet may be employed. However, this would make the motor 63 larger and more complicated.

Additionally, the air bearing 66 is arranged outside the motor 63 in the pump 60 of FIG. 9. Thus, the motor 63 and the bearing 66 must be installed on the pump 60. Further, the bearing 66 must be assembled together with the motor 63. This increases the number of steps for manufacturing the pump 60 and complicates manufacturing. In addition, the location of the bearing 66 imposes design restrictions to the pump 60.

Accordingly, a motor that employs only a magnetic bearing has been proposed for turbo-molecular pumps. However, the magnetic bearing must be made of a magnetic material having strong magnetism to be small enough to fit in the motor. Such magnetic material is expensive and increases the cost of the motor.

SUMMARY OF THE INVENTION

It is an object of the present invention to provide a compact motor and turbo-molecular pump.

To achieve the above object, the present invention provides a motor including a rotary shaft. An axial urging force is applied to the rotary shaft in a first direction when the motor is driven. A first magnetic bearing supports the rotary shaft. A second magnetic bearing supports the rotary shaft. The first and second magnetic bearings each include two magnets that repel each other. A resultant force of the repulsion of the first magnetic bearing and the repulsion of the second magnetic bearing acts in a direction opposite to the first direction.

A further aspect of the present invention provides a vacuum pump provided with a motor. The motor includes a rotary shaft. An axial urging force is applied to the rotary shaft in a first direction when the motor is driven. A first magnetic bearing supports the rotary shaft. A second magnetic bearing supports the rotary shaft. The first and second magnetic bearings each include two magnets that repel each other. A resultant force of the repulsion of the first magnetic bearing and the repulsion of the second magnetic bearing acts in a direction opposite to the first direction.

Another aspect of the present invention provides a motor including a case, a rotary shaft projecting from the case, and a first magnetic bearing and a second magnetic bearing for supporting the rotary shaft and restricting axial movement of the rotary shaft. The first magnetic bearing includes a first rotated magnet fixed to the rotary shaft to rotate integrally with the rotary shaft and a first fixed magnet fixed to the case opposing the first rotated magnet and separated from the first rotated magnet by a first distance. The first rotated magnet and the first fixed magnet have the same polarity. The second magnetic bearing includes a second rotated magnet fixed to the rotary shaft to rotate integrally with the rotary shaft, and a second fixed magnet fixed to the case opposing the second rotated magnet and separated from the second rotated magnet by a second distance. The second rotated magnet and the second fixed magnet have the same polarity. An area of opposition between the first rotated magnet and the first fixed magnet differs from an area of opposition between the second rotated magnet and the second fixed magnet.

In a further aspect of the present invention, a pressure generating apparatus generates a predetermined pressure. The apparatus includes a motor. The motor includes a rotary shaft having a distal end and a basal end, and a non-contact bearing for supporting the rotary shaft. A vane is rotated integrally with the rotary shaft. A first chamber is located at the distal end of the rotary shaft. A second chamber is located at the basal end of the rotary shaft. A passage connects the first and second chambers.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A turbo-molecular pump 1 according to a first embodiment of the present invention will now be described with reference to FIGS. 1 to 4.

Figure 1:
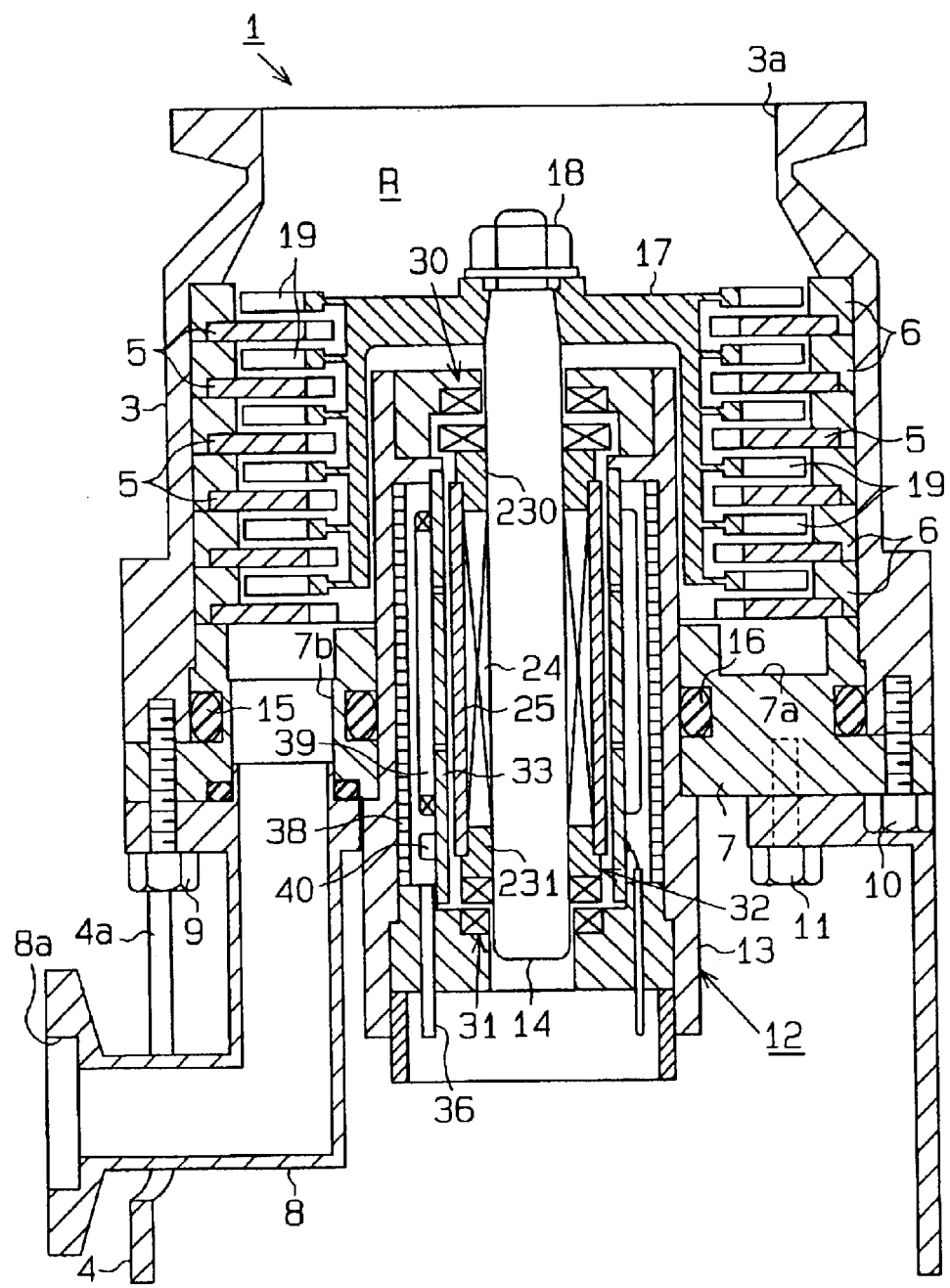
FIG. 1 is a cross-sectional view showing a turbo-molecular pump according to a first embodiment of the present invention.

As shown in FIG. 1, the turbo-molecular pump 1 includes a tubular upper housing 3 and a lower housing 4. The turbo-molecular pump 1 has an intake 3a connected to the vacuum chamber of an apparatus (not shown). A plurality of stator vanes 5 extend from a support 6 fitted into the upper housing 3.

An annular adapter 7 is fixed to the lower end of the upper housing 3 by a first bolt 9 and a plurality of second bolts 10 (only one shown). The adapter 7 has an annular groove 7a. A bore 7b extends from the groove 7a. An exhaust pipe 8 is fastened to the upper housing 3 by way of the adapter 7 and connected with the bore 7b. The lower housing 4 is fastened to the adapter 7 by a plurality of bolts 11. An opening 4a is formed in the side wall of the lower housing 4. The exhaust pipe 8 extends through the opening 4a and out of the lower housing 4. The distal end of the exhaust pipe 8 is flanged and defines an exhaust port 8a.

The adapter 7 supports a case 13 of a brushless motor 12. The brushless motor 12 has a rotary shaft 14 extending toward the intake 3a. An O-ring 15 seals between the adapter 7 and the upper housing 3, and an O-ring 16 seals between the adapter 7 and the motor 12. The space between the intake 3a and the adapter 7 defines an intake chamber R.

A generally cup-like wheel 17 driven by the brushless motor 12 is secured to the distal end of the rotary shaft 14 by a nut 18. A plurality of rotor vanes 19 extend radially from the outer wall of the wheel 17 into the gaps formed between the stator vanes 5. The rotation of the motor 12 draws gas into the gaps from the intake chamber R and discharges the gas from the exhaust port 8a.

Figure 2:
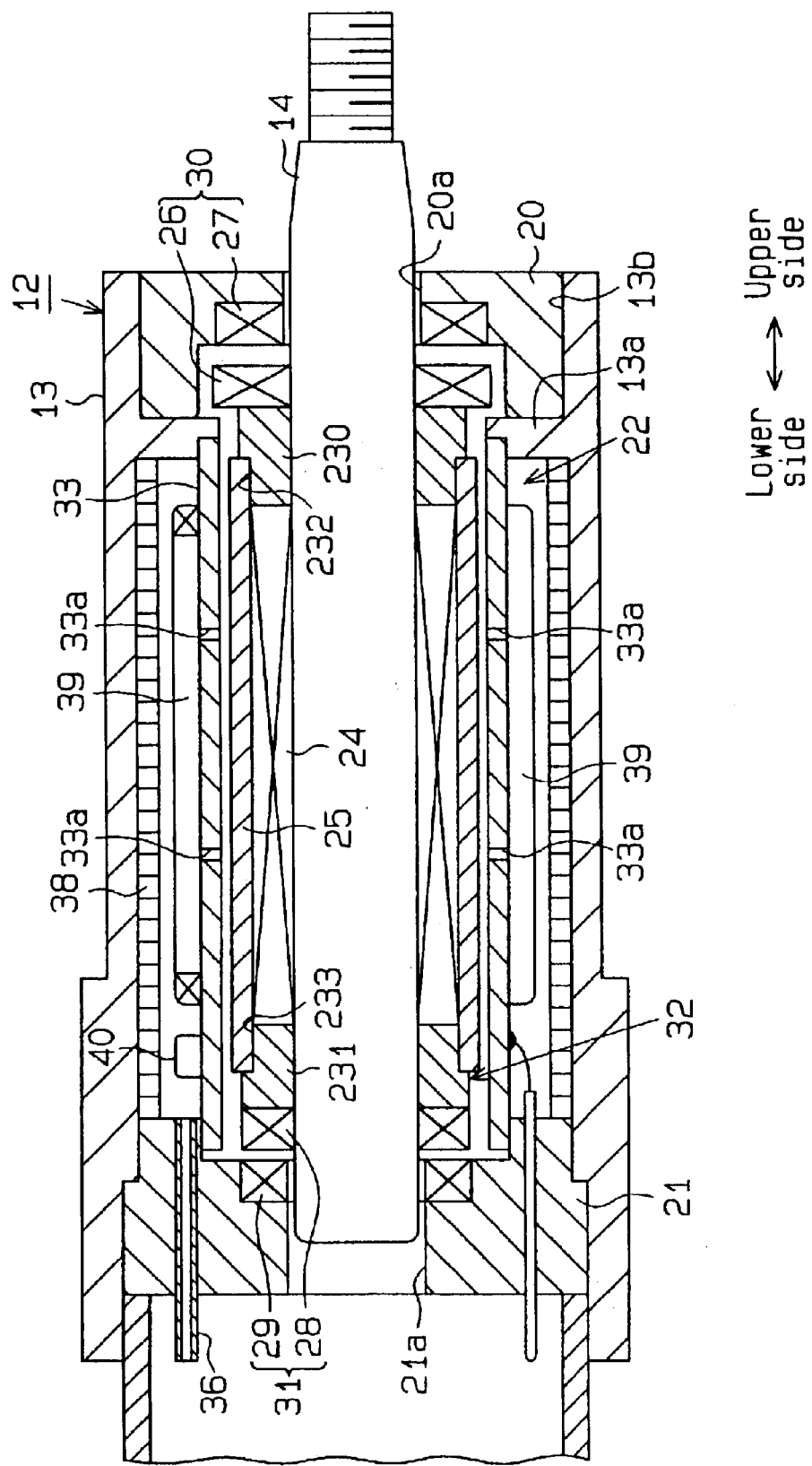
FIG. 2 is an enlarged cross-sectional view showing the motor of FIG. 1.

As shown in FIG. 2, a ring 13a extends radially toward the rotary shaft 14 from the inner wall of the case 13. The ring 13a forms a stepped portion 13b at the upper portion of the case 13 (the right side as viewed in FIG. 2). An upper plug 20 is fitted into the stepped portion 13b and fastened by bolts (not shown). A shaft bore 20a extends through the center of the upper plug 20.

A lower plug 21 is fitted to the lower side of the case 13 (the left side as viewed in FIG. 2). A motor compartment 22 is formed in the case 13 between the upper and lower plugs 20, 21.

The lower end of the rotary shaft 14 is arranged in a shaft bore 21a of the lower plug 21. The upper end of the rotary shaft 14 passes through the shaft bore 20a and projects from the case 13. An upper bushing 230 and a lower bushing 231 are fixed to the rotary shaft 14 with a predetermined axial distance between them. Annular stepped portions 232, 233 are formed on the upper and lower bushings 230, 231, respectively. A cylindrical rotated cover (rotating tube) 25 is supported between the two stepped portions 232, 233 to cover the rotary shaft 14. The rotated cover 25 is a ceramic sintered body. A field magnet 24 is held between the upper and lower bushings 230, 231 and covered by the rotated cover 25. The field magnet 24 includes four permanent magnetic pieces (not shown), which are parallel to one another and extend axially about the rotary shaft 14. Further, the four permanent magnetic pieces are arranged to form a cylindrical shape. The polarity of each magnet piece differs from that of the adjacent magnet piece in an alternating manner. The two bushings 230, 231 function to adjust the rotating balance of the rotary shaft 14.

An annular rotated magnet 26 is arranged above the upper bushing 230. The rotated magnet 26 and the upper bushing 230 rotate integrally with the rotary shaft 14. An annular fixed magnet 27 is opposed to the rotated magnet 26 and fitted into the upper plug 20 spaced from the rotated magnet 26. The rotated magnet 26 and the fixed magnet 27 have the same polarity. Accordingly, repulsion is produced between the rotated magnet 26 and the fixed magnet 27. The inner diameter of the fixed magnet 27 is equal to the inner diameter of the shaft bore 20a. The fixed magnet 27 does not contact the rotary shaft 14.

An annular rotated magnet 28 is arranged below the lower bushing 231. The rotated magnet 28 and the lower bushing 231 rotate integrally with the rotary shaft 14. An annular fixed magnet 29 is opposed to the rotated magnet 28 and fitted into the lower plug 21 spaced from the rotated magnet 28. Accordingly, repulsion is produced between the rotated magnet 28 and the fixed magnet 29. The inner diameter of the fixed magnet 29 is equal to the inner diameter of the shaft bore 21a. The fixed magnet 29 does not contact the rotary shaft 14.

The magnets 26–29 are preferably neodymium magnets. Magnets made of other materials, such as samarium or ferrite, may also be used as the magnets 26–29.

The two upper magnets 26, 27 function as an upper magnetic bearing 30, while the two lower magnets 28, 29 function as a lower magnetic bearing 31. The upper and lower magnetic bearings 30, 31 restrict axial movement of the rotary shaft 14. That is, the repulsion of the upper magnets 26, 27 restricts upward movement of the rotary shaft 14, while the repulsion of the lower magnets 28, 29 restricts downward movement of the rotary shaft 14. Accordingly, the rotary shaft 14 is maintained at a position where the repulsion is balanced.

The inner diameters of the two rotated magnets 26, 28 are substantially equal. The outer diameters of the two upper magnets 26, 27 are larger than the outer diameters of the two lower magnets 28, 29. Accordingly, the area of opposition between the two upper magnets 26, 27 is greater than that between the two lower magnets 28, 29. In other words, the area across which the two upper magnets 26, 27 face each other is greater than that of the two lower magnets 26, 29.

When magnets are made of the same material, the repulsion therebetween is substantially proportional to the area of opposition. Accordingly, the repulsion force between the upper magnets 26, 27 (the upper magnetic bearing 30) is greater than that between the lower magnets 28, 29 (the lower magnetic bearing 31). As a result, when the two repulsion forces are balanced, the distance $\delta 1$ between the upper magnets 26, 27 is greater than the distance $\delta 2$ between the lower magnets 28, 29.

The dimensions of the upper magnetic bearing 30 and the lower magnetic bearing 31 differ to resist the downward force that acts on the wheel 17 during operation of the turbo-molecular pump 1. In the first embodiment, the repulsion of the upper magnetic bearing 30 is greater than that of the lower magnetic bearing 31. Thus, the rotary shaft 14 is located at a lower position when the pump 1 is not operating.

The diameters of the magnets 26–29 are determined so that the magnets 26, 27 do not contact each other regardless of whether the turbo-molecular pump 1 is being operated at full capacity or whether turbo-molecular pump 1 is not being operated at all. The optimal diameters and experiments for obtaining the diameters will be described later.

The rotary shaft 14, the bushings 230, 231, the field magnet 24, the rotated cover 25, and the rotated magnets 26, 28 form a rotary element 32. A cylindrical fixed cover (fixed tube) 33, which is preferably made of a ceramic sintered material (insulating material), is fixed to the ring 13a of the case 13. The fixed cover 33 is separated from the outer surface of the rotated cover 25 by a predetermined distance. Sintered material, such as boron nitride, alumina, zirconia, aluminum nitride, and silicon nitride, may be used to form the rotated cover 25 and the fixed cover 33. The rotated cover 25, which is not required to be electrically insulative, may also be formed from a sintered silicon carbide material.

Figure 3:
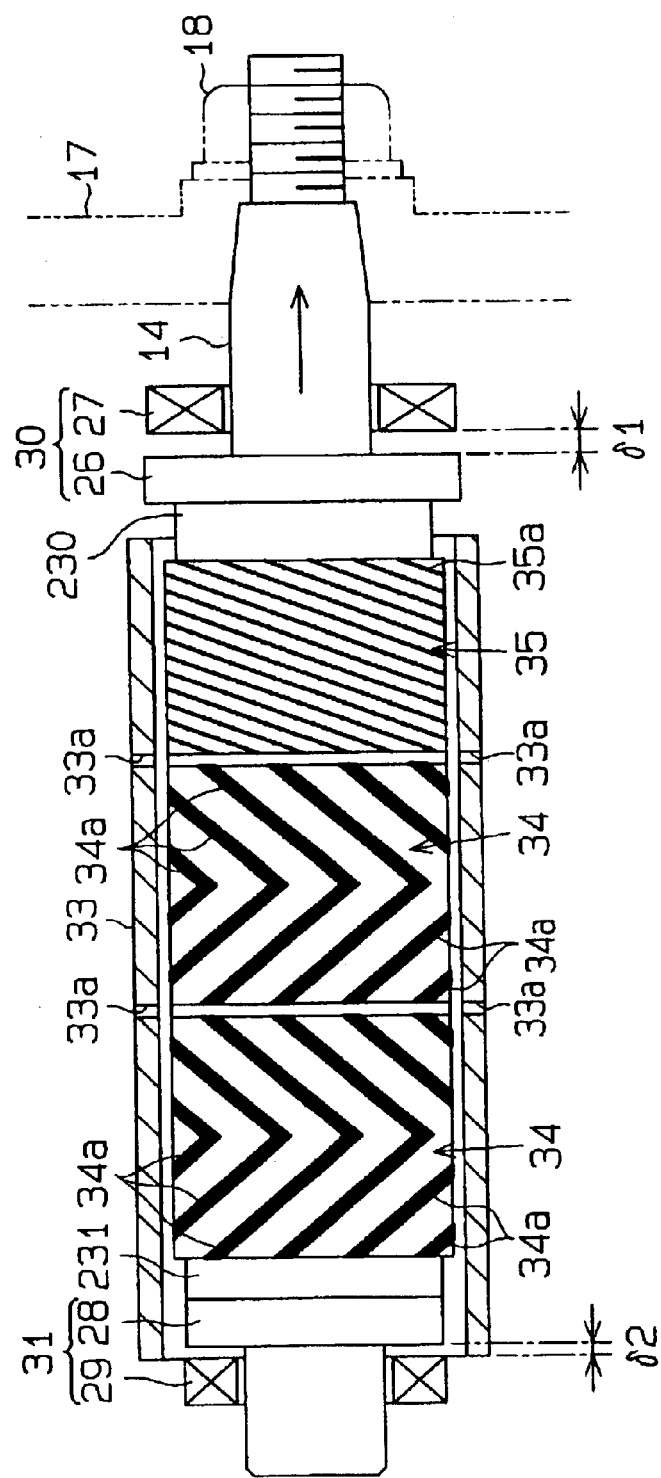
FIG. 3 is an enlarged side view showing the air bearing of FIG. 1.

As shown in FIG. 3, two bearing strips 34 and a gas seal strip 35 are formed on the outer surface of the rotated cover 25. A plurality of equally spaced V-shaped grooves (dynamic pressure grooves) 34a, which are arranged in a herringbone pattern, extend along each of the bearing strips 34. The gas seal strip 35 is located closer to the upper end of the rotated cover 25 than the two bearing strips 34. A helical groove (seal groove) 35a extends along the gas seal strip 35. Rotation of the rotary shaft 14 causes the gas seal strip 35 to prevent the air between the fixed cover 33 and the rotated cover 25 from flowing toward the upper end of the rotary shaft 14. Narrow annular grooves extend between the two bearing strips 34 and between the gas seal strip 35 and the upper bearing strip 34.

The inner surface of the fixed cover 33 is ground to provide a surface having superior sliding characteristics. The fixed cover 33 and the rotated cover 25 (bearing strips 34) form a non-contact air bearing.

With reference to FIGS. 2 and 3, a plurality of vents 33a (six) extend through the fixed cover 33 at positions corresponding to the annular grooves. The vents 33a are located at equal angular intervals in the fixed cover 33.

As shown in FIG. 2, a tubular yoke 38 is fitted in the inner wall of the case 13. An air supply pipe 36 extends through the lower plug 21 and connects the space between the fixed cover 33 and the yoke 38 to the exterior of the pump 1.

When the brushless motor 12 is started, the V-shaped grooves 34a draws air through the vents 33a and into the gap between the fixed cover 33 and the rotated cover 25. High speed rotation of the rotary element 32 increases the rate of air flow into the gap between the rotated cover 25 and the fixed cover 33. This forms a compressed gas layer in the gap thereby restricting radial movement of the rotary shaft 14 and allowing smooth rotation of the rotary shaft 14.

Three armature coils 39, which function as armatures, are arranged at equal angular intervals along the outer surface of the fixed cover 33. The mechanical angle (length) of each armature coil 39 is about 90 to 120 degrees.

Three magnetic sensors, or Hall devices 40, are arranged on the outer surface of the fixed cover 33 in correspondence with the armature coils 39. Each of the Hall devices 40 detect changes in the polarity of the field magnet 24. A control circuit (not shown) measures the rotating speed of the rotary shaft 14 based on the detection signal of the Hall devices 40 and performs feed back control to adjust the flow of current supplied to the armatures 39 and control the rotating speed of the rotary shaft 14.

Experimental determination of the diameters of the magnetic bearings 30, 31, that is, the diameters of the magnets 26–29, will now be described. In an experiment, the lower magnets 28, 29 had a fixed outer diameter of 11 mm. Pairs of magnets having outer diameters ranging from 11 mm to 15 mm were used as the upper magnets 26, 27. The outer diameter of 11 mm for the lower magnets 28, 29 was selected so that the outer diameter of the magnetic bearing 31 is about the same as the outer diameter of the rotary element 32. This enables the production of a more compact pump while obtaining the necessary repulsion forces.

An axial force was then applied to the rotary shaft 14 to urge the rotary shaft 14 upward. The axial force was gradually increased starting from 0 kgf. The distance $\delta 1$ between the magnets 26, 27, and the distance $\delta 2$ between the magnets 28, 29 were measured (refer to FIG. 3).

Figure 4:
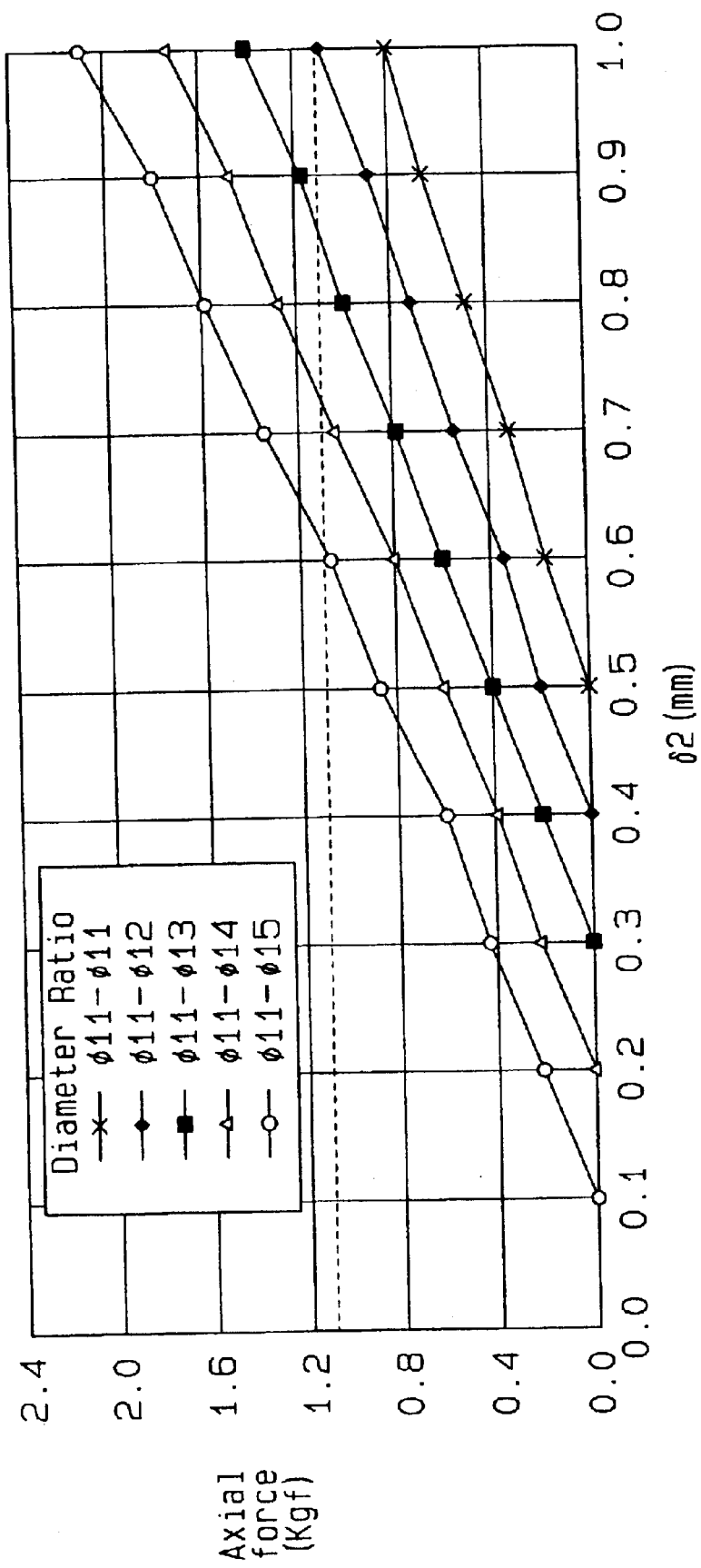
FIG. 4 is a graph showing the relationship between the force applied to the rotary shaft and the distance between two magnets in the magnetic bearing.

The results of the experiment are shown in FIG. 4. The horizontal axis represents the distance $\delta 2$ between the magnets 28, 29. The vertical axis represents the axial force applied to the rotary shaft 14. In the first embodiment, the distance between the bottom of the upper fixed magnet 27 and the top of the lower fixed magnet 29 is greater than the distance between the top of the upper rotated magnet 26 and the bottom of the lower rotated magnet 28 by 1.0 mm. Thus, the total of the distances $\delta 1$, $\delta 2$ is 1.0 mm, and $\delta 1$ is represented by 1–$\delta 2$.

The maximum value of the axial force applied to the rotary shaft 14 was 1.1 kgf (indicated by broken line in FIG. 4). The minimum value of the axial force applied to the rotary shaft 14 was 0 kgf. The magnets are required to have outer diameters that prevent distances $\delta 1$, $\delta 2$ from becoming null within the range of 0 to 1.1 kgf.

As apparent from FIG. 4, it is preferred that the outer diameters of the magnets 26, 27 be in the range of 13 mm to 15 mm. In this range, the case 13 does not need to be enlarged. Although not shown, when the outer diameters of the magnets 26, 27 are 16 mm, the distance δ2 is 0 mm if the axial force is 0 kgf.

In the first embodiment, the outer diameters of the lower (basal) magnets 28, 29 are 11 mm and the outer diameters of the upper (distal) magnets 26, 27 are 14 mm. The ratio (diameter ratio) 11 mm/14 mm of these diameters maximizes the distances δ1, δ2 under normal operation conditions.

Other ratios of these diameters, such as 11 mm/13 mm, are effective for providing a smaller motor 12. The ratio 11 mm/15 mm of these diameters further guarantees that the magnets 26, 27 do not contact.

The operation of the bearings when the pump 1 is actuated will now be discussed.

When the pressure at the intake 3a is atmospheric, the rotary element 32 is located at a low position. In this state, the ratio of distance δ1 relative to distance δ2 is 8:2.

When the motor 12 is driven, the V-shaped grooves 34a form a compressed air layer in the gap between the fixed cover 33 and the rotated cover 25. The compressed air layer holds the rotary element 32 in a floating state so that the rotary element 32 does not contact the inner surface of the fixed cover 33. Accordingly, the compressed air layer supports the rotary element 32 radially.

The rotation of the rotor vanes 19 relative to the stator vanes 5 causes the air in the intake chamber R to flow through the exhaust pipe 8 and be discharged. As the pressure of the vacuum chamber decreases, an axial force acting to move the wheel 17 in an upward direction increases. As the axial force increases, the rotary shaft 14 is displaced in the direction indicated by the arrow in FIG. 3. This gradually changes the ratio between the distances δ1, δ2 (δ1:δ2) from 8:2 to 3:7. When the axial force reaches a maximum, the magnets 26, 27 do not contact each other, and the two magnetic bearings 30, 31 support the rotary shaft 14 in an optimal manner.

The advantages of the first embodiment will now be discussed.

The magnetic bearings 30, 31 are just large enough to resist the load applied to the rotary shaft 14. Thus, the turbo-molecular pump 1 is compact and has a simple structure.

The magnets 26–29 are made of the same material and differ only in outer diameter. Since this decreases the number of materials used to manufacture the brushless motor, the production cost of the brushless motor 12 is not increased.

The diameter ratios of the pair of magnets 26, 27 relative to the pair of magnets 28, 29 are determined so that the distance δ1 and the distance δ2 are as long as possible. In the first embodiment, the distance δ1 between the magnets 26, 27 and the distance δ2 between the magnets 28, 29 are set so that the ratio therebetween is 8:2 in an initial state. Thus, contact between the magnets 26–29 is avoided even if the magnets 26–29 have different dimensions or if different forces are applied to the rotary shaft 14.

The bearing strips 34 are formed on the outer surface of the rotated cover 25, which covers the field magnet 24. Thus, the brushless motor 12 is compact and has a simple structure.

The outer diameters of the lower magnets 28, 29 are about the same or slightly smaller than the outer diameter of the rotary element 32. Further, the outer diameters of the upper magnets 26, 27 are larger than the outer diameter of the rotary element 32. However, the magnets 26–29 have the minimal required dimensions. Accordingly, the motor 12 resists axial movement without increasing the outer diameter of the case 13.

A second embodiment according to the present invention will now be discussed. The description will center on parts that differ from the first embodiment.

Figure 5:
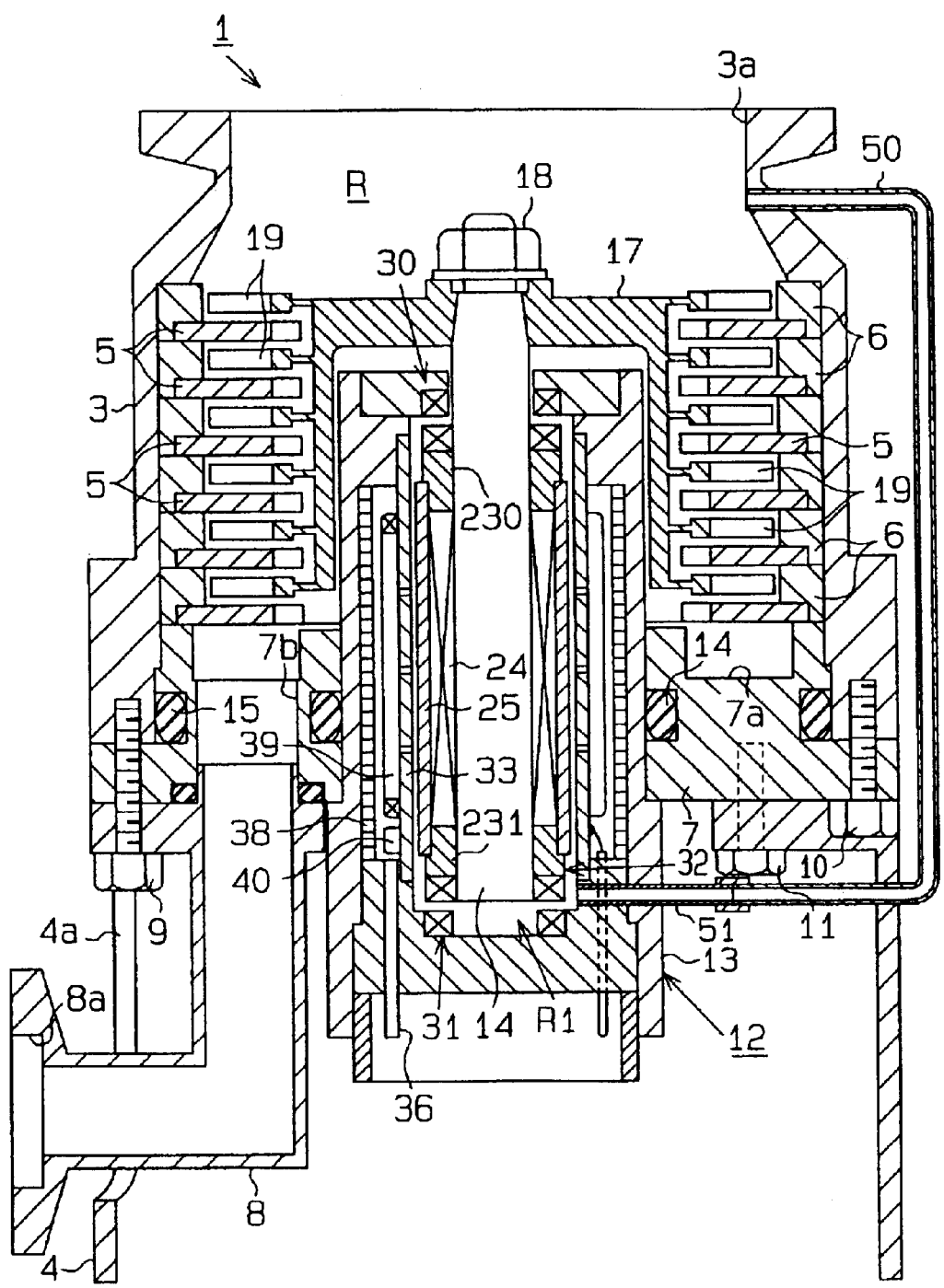
FIG. 5 is a cross-sectional view showing a turbo-molecular pump according to a second embodiment of the present invention.

The turbo-molecular pump 1 of the second embodiment will be described with reference to FIGS. 5 and 6. The upper magnetic bearing 30 is formed by the pair of upper magnets 26, 27. The lower magnetic bearing 31 is formed by the pair of lower magnets 28, 29. The lower fixed magnet 29 is arranged in the lower plug 21. The magnets 26–29 are all preferably neodymium magnets. Other materials, such as samarium or ferrite, may also be used for the magnets 26–29.

The upper magnetic bearing 30 restricts upward movement of the rotary shaft 14. The lower magnetic bearing 31 restricts downward movement of the rotary shaft 14. The upper and lower rotated magnets 26, 28 have the same dimensions (inner diameter and outer diameter). The upper and lower fixed magnets 27, 29 have the same dimensions (inner diameter and outer diameter). Accordingly, the repulsion between the pair of magnets 26, 27 is substantially the same as the repulsion between the magnets 28, 29.

Figure 7:
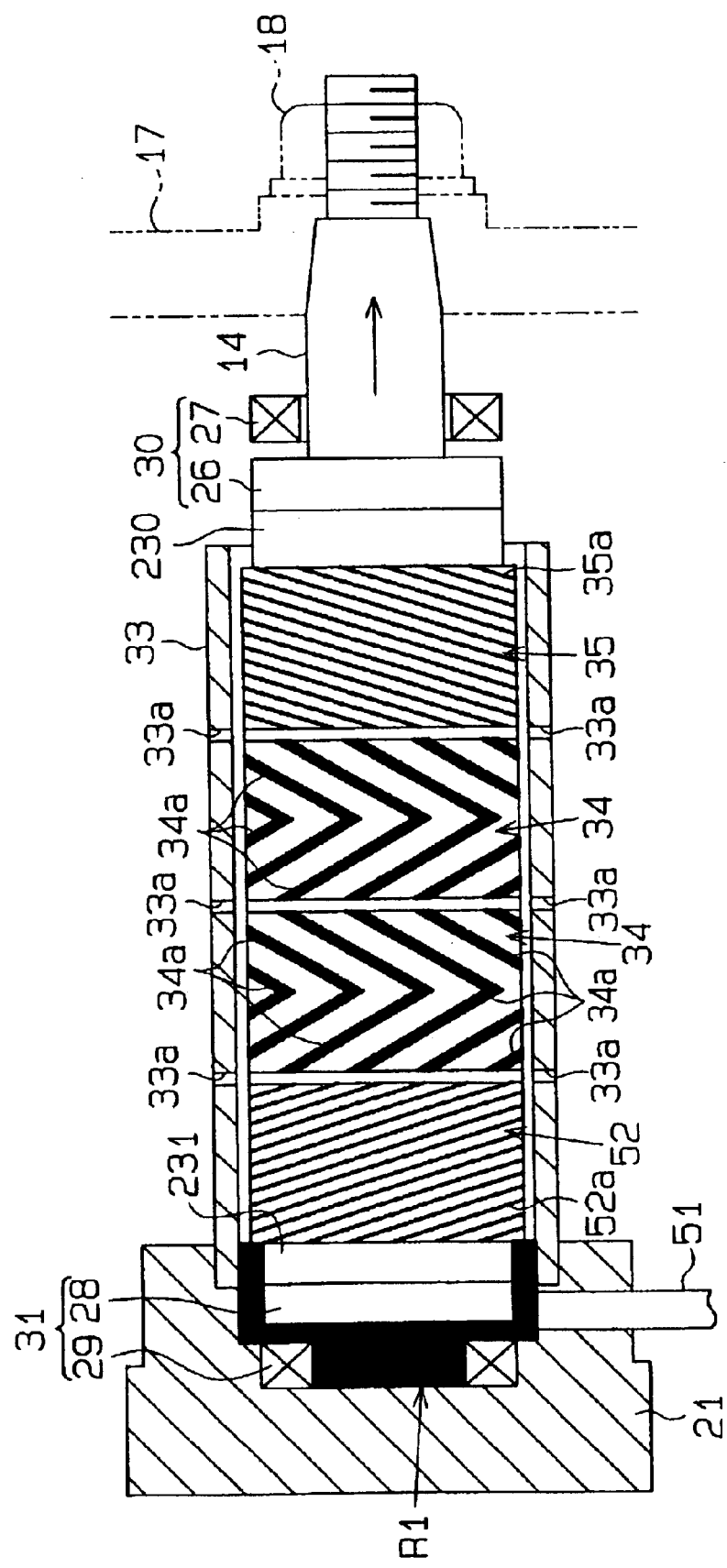
FIG. 7 is an enlarged side view showing the air bearing of FIG. 5.

As shown in FIG. 7, two bearing strips 34 and two gas seal strips 35, 52 are provided on the outer surface of the rotated cover 25. The two bearing strips 34 are located between the two gas seal strips 35, 52. Helical grooves 35a, 52a extend along the gas seal strips 35, 52, respectively. The V-shaped grooves 34a on each bearing strip 34 form a compressed gas layer between the bearing strips 34 and the fixed cover 33 during rotation of the rotary shaft 14. Accordingly, the fixed cover 33 and the rotated cover 25 (bearing strips 34) form an air bearing. The helical grooves 35a function to prevent air, which forms the compressed gas layer, from leaking toward the upper end of the rotary shaft 14. The helical grooves 52a function to prevent the air forming the compressed gas layer from leaking toward the lower end of the rotary shaft 14.

The rotated cover 25 has three annular grooves formed between the two bearing strips 34, the upper gas seal strip and the upper bearing strip 34, and the lower gas seal strip 52 and the lower bearing strip 34.

Figure 6:
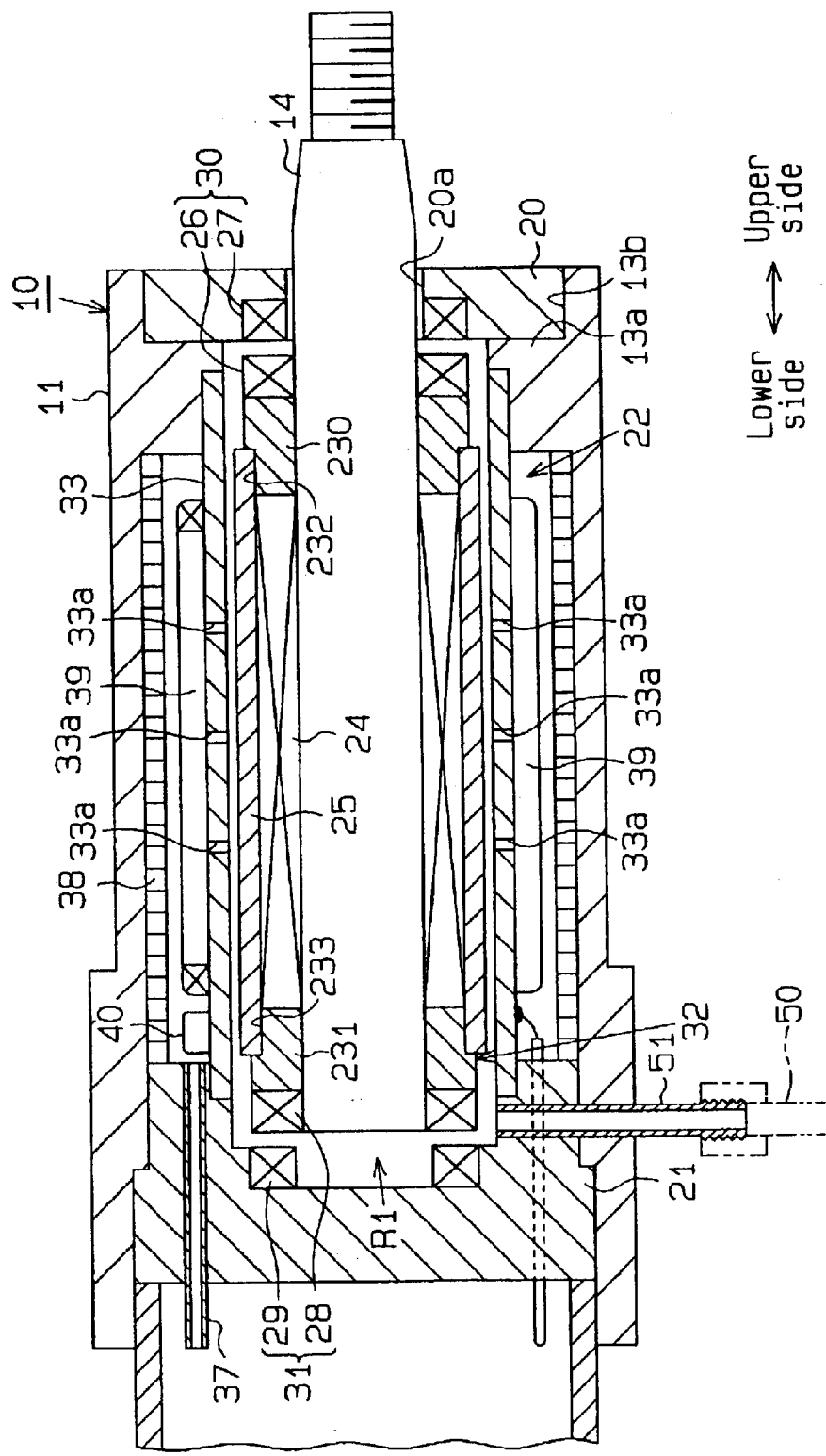
FIG. 6 is an enlarged cross-sectional view showing the motor of FIG. 5.

As shown in FIGS. 6 and 7, the fixed cover 33 has a plurality of vents 33a (nine) arranged in three rows in correspondence with the three narrow annular grooves. The vents 33a are arranged at equal angular intervals.

The lower plug 21 of the second embodiment does not have the shaft bore 21a of the first embodiment. The lower plug 21, the lower bushing 231, the fixed cover 33, and the gas seal strip 52 define a pressure balancing chamber R1 (shown in black in FIG. 7) about the lower end of the rotary shaft 14. The lower end of the rotary element 32 (rotary shaft 14) is exposed to the pressure balancing chamber R1.

A pipe 51 extends from the pressure balancing chamber R1. A pipe 50 extends from the intake chamber R and connects with the pipe 51. The pipes 50, 51 define a pressure passage connecting the intake chamber R to the pressure balancing chamber R1. The gas in the pressure balancing chamber R1 is drawn into the intake chamber R through the pressure passage. This decreases the pressure of the pressure balancing chamber R1. The pressure passage may also connect part of the exhaust pipe 8 to the pressure balancing chamber R1. In this case, an auxiliary pipe connected to the exhaust pipe 8 discharges the air in the pressure balancing chamber R1 together with the air in the exhaust pipe 8 and lowers the pressure of the pressure balancing chamber R1.

The pressure of the intake chamber R is substantially atmospheric before starting operation of the motor 12. When the motor 12 is started, the rotor vanes 19 rotate relative to the stator vanes 5. The relative rotation causes air to be drawn downward from the intake chamber R and discharges the air from the exhaust pipe 8. Further, the air in the pressure balancing chamber R1 is sent to the intake chamber R through the pipes 50, 51 and is discharged. As a result, the pressures of the pressure balancing chamber R1 and the intake chamber R become substantially the same.

When the pressure of the intake chamber R differs from the pressure of the pressure balancing chamber R1, the rotary shaft 14 receives an axial force, indicated by the arrow in FIG. 7. As the pressure difference between the intake chamber R and the pressure balance chamber R1 decreases, the axial force becomes smaller. In the second embodiment, the pressures of the pressure balancing chamber R1 and the intake chamber R are substantially the same. Thus, the axial force applied to the rotary shaft 14 includes only the weight of the wheel 17 and is thus constant. As a result, the rotary shaft 14 is supported even though the magnetic bearings 30, 31 are small. Further, when the turbo-molecular pump 1 is driven until reaching the maximum vacuum state, the rotary shaft 14 hardly moves axially.

The second embodiment has the advantages described below.

The intake chamber R and the pressure balancing chamber R1 are connected to substantially equalize the pressures at the upper and lower sides of the wheel 17. Accordingly, the axial force applied to the rotary shaft 14 is small in comparison with the prior art. This enables the rotary shaft 14 to be supported by the small magnetic bearings 30, 31. Further, the rotary shaft 14 hardly moves axially. Thus, the motor 12 and the turbo-molecular pump 1 are compact.

The number of changes in the structure of the turbo-molecular pump 1 and the number of additional procedures for manufacturing the turbo-molecular pump 1 is small. More specifically, the turbo-molecular pump 1 can be manufactured by preparing and connecting the pipe 51, which is connected to the pressure balancing chamber R1, and the pipe 50, which is connected to the intake chamber R.

During rotation of the rotary shaft 14, the gas seal strip 52 disconnects the bearing strips 34 from the pressure balancing chamber R1 and substantially prevents the air of the compressed gas layer from leaking into the pressure balancing chamber R1. Thus, the pressures of the pressure balancing chamber R1 and the intake chamber R remain substantially the same. This eliminates an axial shaft force that would be produced if a pressure difference existed. Therefore, the axial position of the rotary shaft 14 is more stable.

The air bearing is formed between the fixed cover 33 and the rotated cover 25. Thus, the brushless motor 12 has a simple structure.

Figure 8:
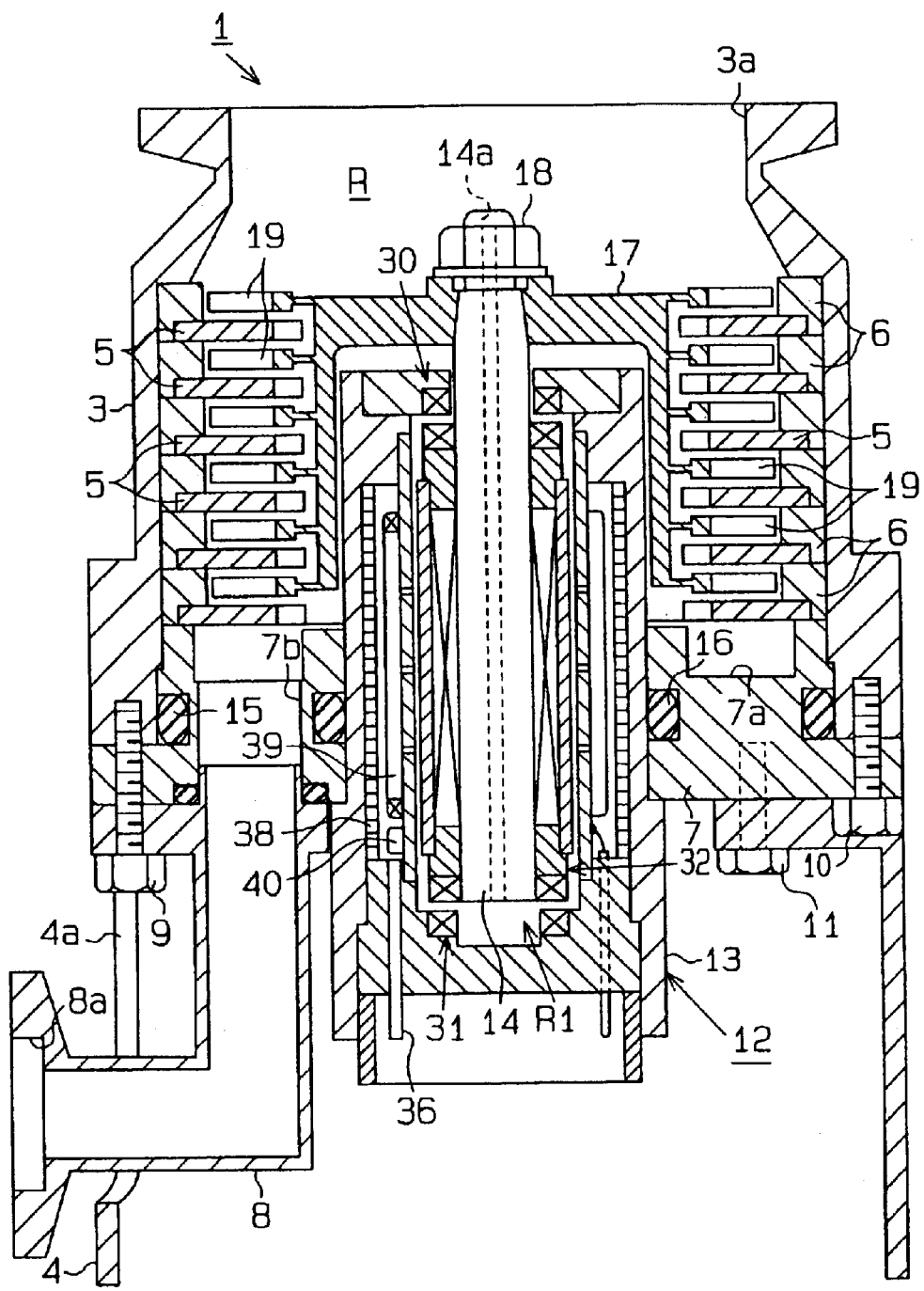
FIG. 8 is a cross-sectional view showing a turbo-molecular pump according to a third embodiment of the present invention.
Figure 9:
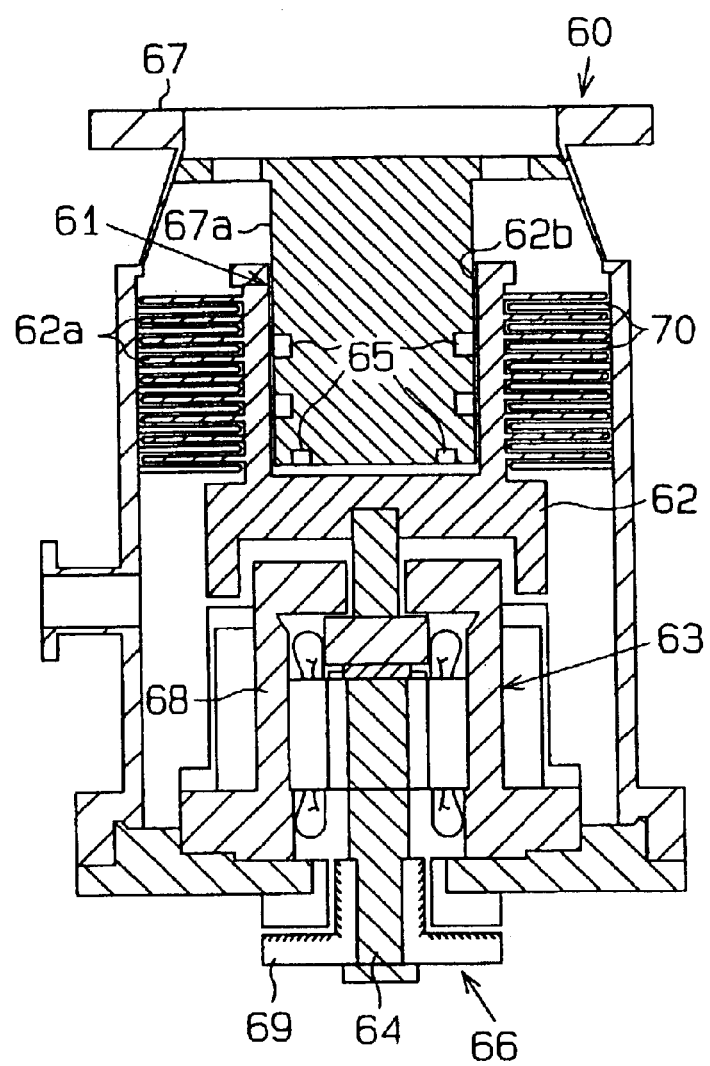
FIG. 9 is a cross-sectional view showing a prior art turbo-molecular pump.

A turbo-molecular pump 1 according to a third embodiment of the present invention will now be discussed. The description will center on parts differing from the second embodiment. As shown in FIG. 8, a communication passage 14a extends along the axis of the rotary shaft 14 between the ends of the rotary shaft 14. The communication passage 14a is a pressure passage connecting the intake chamber R to the pressure balancing chamber R1. The pipes 50, 51 are not used in the second embodiment.

The third embodiment has the same advantages as the second embodiment.

It should be apparent to those skilled in the art that the present invention may be embodied in many other specific forms without departing from the spirit or scope of the invention. Particularly, it should be understood that the present invention may be embodied in the following forms.

In the first embodiment, the material of the permanent magnets may be changed to alter and adjust the repulsion forces produced between the magnets 26, 27 and the magnets 28, 29. For example, a permanent magnet made of a material having strong magnetism may be used as the upper magnetic bearing 30, and a permanent magnet made of a material having weak magnetism may be used as the lower magnetic bearing 31. In this case, the magnets 26, 27 may have the same outer diameter.

If the force applied to the rotary shaft 14 acts in a direction opposite to that of the first embodiment, the arrangement of the magnetic bearings 30, 31 may be reversed.

In the first embodiment, the ratio of the outer diameters of the magnets 28, 29 relative to the outer diameters of the magnets 26, 27 may be selected as required from a range of 11 mm/13 mm to 15 mm.

In the first embodiment, the magnets 26–29 do not have to be annular. The permanent magnets may take any shape as long as the area of opposition and the repulsion is constant during rotation of the rotary shaft 14.

In the first embodiment, the magnets 26–29 do not have to be permanent magnets. For example, the magnets 27, 29 may be electromagnets while the magnets 26, 28 are permanent magnets.

In the first embodiment, one of the two magnetic bearings 30, 31 may be an air bearing.

In the first embodiment, if the axial force applied to the rotary shaft 14 is large, a plurality of the upper bearings 30 and a plurality of the lower bearings 31 may be employed. In this case, the outer diameters or material of the bearings are adjusted so that the resultant force of the upper magnetic bearings 30 and the resultant force of the lower magnetic bearings 31 are appropriate. This avoids enlargement in the radial direction.

In the second and third embodiments, the lower end of either the rotary shaft 14 or the lower rotated magnet 28 may be exposed to the pressure of the pressure balancing chamber R1.

The magnetic bearings 30, 31 of the first to third embodiments may be applied to a motor provided with a brush.

The motor 12 of the third embodiment is optimal for a pressure generating apparatus that generates a predetermined pressure, such as a vacuum pump or a compressor. For example, if the motor 12 is used for a compressor, high pressure air acts on the ends of the rotary shaft 14. The substantially equal pressures acting on the ends of the rotary shaft 14 support the rotary shaft 14 with the small magnetic bearings 14. Thus, a small compressor can be provided.

The present examples and embodiments are to be considered as illustrative and not restrictive, and the invention is not to be limited to the details given herein, but may be modified within the scope and equivalence of the appended claims.

What is claimed is:

1. A motor comprising:
   a rotary shaft, wherein an axial urging force is applied to the rotary shaft in a first direction when the motor is driven;
   a first magnetic bearing for supporting the rotary shaft; and
   a second magnetic bearing for supporting the rotary shaft, wherein the first and second magnetic bearings each include two magnets that repel each other, and wherein a resultant force of the repulsion of the first magnetic bearing and the repulsion of the second magnetic bearing acts in a direction opposite to the first direction.

2. A vacuum pump provided with a motor, the motor comprising:

a rotary shaft, wherein an axial urging force is applied to the rotary shaft in a first direction when the motor is driven;

a first magnetic bearing for supporting the rotary shaft; and a second magnetic bearing for supporting the rotary shaft, wherein the first and second magnetic bearings each include two magnets that repel each other, and wherein a resultant force of the repulsion of the first magnetic bearing and the repulsion of the second magnetic bearing acts in a direction opposite to the first direction.

3. A motor comprising:

a case;

a rotary shaft projecting from the case;

a first magnetic bearing and a second magnetic bearing for supporting the rotary shaft and restricting axial movement of the rotary shaft, wherein the first magnetic bearing includes;

a first rotated magnet fixed to the rotary shaft to rotate integrally with the rotary shaft; and a first fixed magnet fixed to the case opposing the first rotated magnet and separated from the first rotated magnet by a first distance, wherein the first rotated magnet and the first fixed magnet have the same polarity; and wherein the second magnetic bearing includes;

a second rotated magnet fixed to the rotary shaft to rotate integrally with the rotary shaft; and a second fixed magnet fixed to the case opposing the second rotated magnet and separated from the second rotated magnet by a second distance, wherein the second rotated magnet and the second fixed magnet have the same polarity, and wherein an area of opposition between the first rotated magnet and the first fixed magnet differs from an area of opposition between the second rotated magnet and the second fixed magnet.

4. The motor according to claim 3, wherein the first rotated magnet, the first fixed magnet, the second rotated magnet, and the second fixed magnet are made of the same material.

5. The motor according to claim 4, wherein the magnets are annular, the first rotated and second rotated magnets have substantially the same inner diameters, the first fixed and second fixed magnets have substantially the same inner diameters, the first rotated and first fixed magnets have substantially the same outer diameters, and the second rotated and second fixed magnets have substantially the same outer diameters, and the ratio between the outer diameter of the first rotated and first fixed magnets relative to the outer diameter of the second rotated and second fixed magnets is in the range of 11:13 to 11:15.

6. A motor installed in a turbo-molecular pump having an intake chamber and for driving the turbo-molecular pump to generate a reduced pressure in the intake chamber, the motor comprising:

a rotary shaft, wherein the rotary shaft receives an axial urging force in a first direction during operation of the turbo-molecular pump, the axial urging force varying according to the pressure in the intake chamber; and a first magnetic bearing and a second magnetic bearing for axially supporting the rotary shaft, wherein a resultant repulsion force of the first magnetic bearing and the second magnetic bearing acts in a second direction opposite to the first direction so that the rotary shaft is placed at an offset position when the motor is stopped.

7. A turbo-molecular pump comprising:

an intake chamber; and a motor for driving the turbo-molecular pump, the motor including:

a rotary shaft, wherein the rotary shaft receives an axial urging force in a first direction during operation of the turbo-molecular pump, the axial urging force varying according to the pressure in the intake chamber; and a first magnetic bearing and a second magnetic bearing for axially supporting the rotary shaft, wherein a resultant repulsion force of the first magnetic bearing and the second magnetic bearing acts in a second direction opposite to the first direction so that the rotary shaft is placed at an offset position when the motor is stopped.

* * * * *